(12) United States Patent
Liu

(10) Patent No.: US 11,291,082 B2
(45) Date of Patent: Mar. 29, 2022

(54) ELECTRONIC CIGARETTE

(71) Applicant: Tuanfang Liu, Shenzhen (CN)

(72) Inventor: Tuanfang Liu, Shenzhen (CN)

(*) Notice: Subject to any disclaimer, the term of this patent is extended or adjusted under 35 U.S.C. 154(b) by 802 days.

(21) Appl. No.: 16/147,905

(22) Filed: Oct. 1, 2018

(65) Prior Publication Data
US 2019/0029324 A1 Jan. 31, 2019

Related U.S. Application Data

(63) Continuation-in-part of application No. 14/682,081, filed on Apr. 8, 2015, now abandoned.

(30) Foreign Application Priority Data

Dec. 26, 2014 (CN) .......................... 201410825071.5
Dec. 26, 2014 (CN) .......................... 201420845547.7

(51) Int. Cl.
| H05B 1/02 | (2006.01) |
| A24F 40/40 | (2020.01) |
| A24F 40/60 | (2020.01) |
| H02J 7/00 | (2006.01) |
| A24F 40/10 | (2020.01) |
| H05B 3/46 | (2006.01) |

(52) U.S. Cl.
CPC ............ *H05B 1/0227* (2013.01); *A24F 40/40* (2020.01); *A24F 40/60* (2020.01); *H05B 3/46* (2013.01); *A24F 40/10* (2020.01); *H02J 7/0047* (2013.01)

(58) Field of Classification Search
CPC ............ A24F 40/40; A24F 40/51; A24F 40/20
See application file for complete search history.

(56) References Cited

U.S. PATENT DOCUMENTS

| 2011/0226236 A1* | 9/2011 | Buchberger | ......... A61K 31/465 |
| | | | 128/200.23 |
| 2015/0189919 A1* | 7/2015 | Liu | .......................... A24F 40/40 |
| | | | 131/329 |
| 2016/0331030 A1* | 11/2016 | Ampolini | ................. H05B 3/03 |

* cited by examiner

Primary Examiner — Jean F Duverne
(74) Attorney, Agent, or Firm — Matthias Scholl P.C.; Matthias Scholl

(57) ABSTRACT

An electric cigarette including a detachable cover for enclosing the battery. The cigarette allows for replacing the battery. In addition, the cigarette includes an indicating light for reflecting the state of the battery. In addition, the cigarette includes an atomizing assembly that includes detachable components for maintenance or replacement. In addition, the cigarette includes a transparent casing disposed in atomizing assembly. The cigarette of the invention allows for saving materials and reducing cost burden on a user.

18 Claims, 12 Drawing Sheets

ELECTRONIC CIGARETTE

CROSS-REFERENCE TO RELATED APPLICATIONS

This application is a continuation-in-part of and claims domestic priority to U.S. patent application Ser. No. 14/682,081, filed Apr. 8, 2015, now pending, which claims the benefit of Chinese Patent Application No. 201410825071.5 filed Dec. 26, 2014 and Chinese Patent Application No. 201420845547.7 filed Dec. 26, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to an electronic cigarette, and more particularly to an electronic cigarette in which the battery is detachable and/or the components in the atomizing assembly are detachable.

Description of the Related Art

In general, the battery and the components in the atomizing assembly are not detachable in the conventional electronic cigarette. Therefore, when the battery fails or the components in the atomizing assembly malfunction, the user has to discard the electronic cigarette.

SUMMARY OF THE INVENTION

In view of the above-described problems, it is one objective of the invention to provide an electronic cigarette comprising a detachable battery and/or detachable components in the atomizing assembly.

To achieve the above objective, in accordance with one embodiment of the invention, there is provided an electronic cigarette comprising a power-supply assembly and an atomizing assembly. The power-supply assembly comprises a power-supply shell, a shell connector, a first pipe cover, a pipe, a pipe connector comprising threads, a battery, a second pipe cover comprising threads, and a shell cover. The power-supply shell comprises a cylindrical shell sidewall, a closing shell wall, and a shell cavity. The cylindrical shell sidewall comprises a first sidewall end and a second sidewall end having an opening, and the closing shell wall is disposed on the first sidewall end. The shell cavity is confined by the cylindrical shell sidewall and the closing shell wall. The pipe comprises a first pipe end and a second pipe end. The atomizing assembly comprises an atomizing seat, a supporting rod, a heating-wire holder, a heating wire, a heating-wire cover, an atomizing casing, and an oil-tube assembly. The atomizing seat comprises a flange plate, a seat boss, a cylindrical seat body, and a seat through hole. The flange plate comprises a first flange surface and a second flange surface; the seat boss extends from the first flange surface; and the cylindrical seat body extends from the second flange surface. The seat through hole extends through the cylindrical seat body, the flange plate, and the seat boss. The heating-wire cover comprises a first heating-wire-cover end and a second heating-wire-cover end. The oil-tube assembly comprises an oil-tube holder, an elastic element, an oil tube, a tube limit part, and an oil-tube-assembly cover. The oil-tube holder comprises an oil-tube-holder end, and the oil-tube-assembly cover comprises an oil-tube through hole. In the electronic cigarette, the shell connector is fixed on the closing shell wall. In addition, the first pipe cover is disposed within the shell cavity and fixed on the closing shell wall; the pipe is disposed within the shell cavity; the first pipe end is fixed to the first pipe cover; the pipe connector is fixed on the second pipe end; the battery is inserted in the pipe; the second pipe cover is screwed to the pipe connector; the battery is enclosed by the pipe, the first pipe cover, and the second pipe cover; and the shell cover is fixed to the second sidewall end. In addition, the cylindrical seat body is fixed to the shell connector; the supporting rod is inserted in the seat through hole and is supported by the shell connector; the heating-wire holder is inserted in the seat through hole and is supported by the supporting rod; the heating wire is inserted in the heating-wire holder; the second heating-wire-cover end is inserted in the seat through hole and is fixed to the seat boss; and the heating-wire holder is enclosed by the heating-wire cover. In addition, the atomizing casing is disposed on the flange plate. In addition, the elastic element is inserted in the oil-tube holder; the oil tube is inserted in the oil-tube holder; the tube limit part is inserted in and fixed to the oil-tube holder; the oil tube is supported by the elastic element and is abutted by the tube limit part; the oil-tube-assembly cover is fixed to the oil-tube-holder; and the oil tube extends through the oil-tube through hole. Furthermore, the oil-tube-holder end is fixed to the first heating-wire-cover end; and the atomizing casing is abutted by the oil-tube-assembly cover. The electronic cigarette allows for replacing the battery by unscrewing the second pipe cover from the pipe connector.

In a class of one embodiment, the electronic cigarette further comprises a light-guiding plate and an indicating light, and the power-supply assembly further comprises a printed circuit board assembly (PCBA) board disposed within said shell cavity. The light-guiding plate is disposed on the indicating light. In addition, the PCBA board is connected to the battery and to the indicating light. Furthermore, the indicating light is adapted to reflect a state of said battery. By virtue of the indicating light, the user can judge what energy level the battery has or whether the battery fails. If the battery is chargeable, the user can judge whether the battery is in a charging state by virtue of the indicating light.

In a class of one embodiment, the oil-tube-holder end and the first heating-wire-cover end comprise threads; and the oil-tube-holder end is screwed to the first heating-wire-cover end. This allows for detaching the oil-tube assembly for oil replenishment, maintenance, or replacement.

In a class of one embodiment, the second heating-wire-cover end and the seat boss comprises threads; and the second heating-wire-cover end is screwed to the seat boss. This allows for detaching the heating-wire cover to replace the heating wire.

In a class of one embodiment, the atomizing casing is transparent. Due to the transparent atomizing casing, the user can observe the oil level in the oil tube and the amount of smoke generated.

In a class of one embodiment, the indicating light is disposed on the seat boss, so that the indicating light is observable through the transparent atomizing casing.

In a class of one embodiment, the cylindrical seat body and the shell connector comprise threads; and the cylindrical seat body is screwed to the shell connector. This allows for detaching the entire atomizing assembly for maintenance or replacement.

Advantages to embodiments of the invention are summarized as follows:

The cover for enclosing the battery is detachable so that the battery is replaceable. There is an indicating light for reflecting the state of said battery. In addition, the oil-tube assembly is detachable for oil replenishment, maintenance, or replacement. In addition, the cover for enclosing the heating wire is detachable to replace the heating wire. In addition, the atomizing casing is transparent, so that the oil level in the oil tube and the amount of smoke generated can be observed. In addition, the atomizing assembly is detachable for maintenance or replacement.

BRIEF DESCRIPTION OF THE DRAWINGS

The invention is described hereinbelow with reference to the accompanying drawings, in which.

Figure 1:
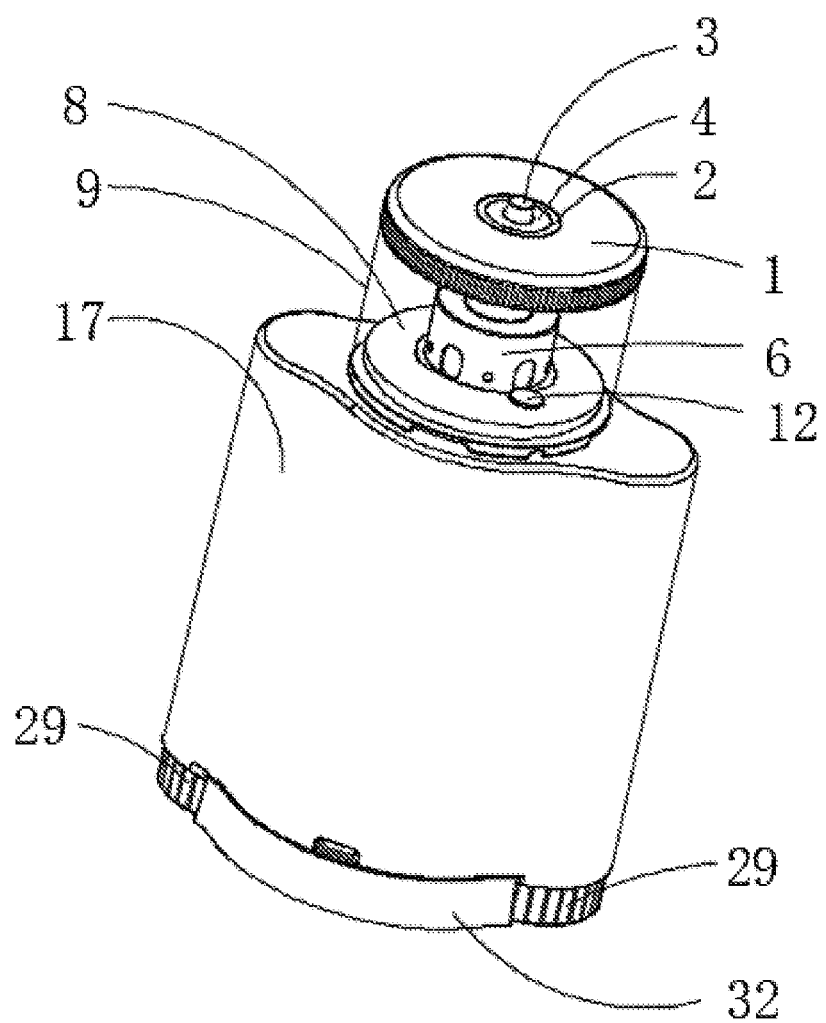
FIG. 1 is a first perspective view of an electronic cigarette in accordance with one embodiment of the invention.

In the drawings, the following reference numbers are used: 1. Oil-tube-assembly cover; 2. Oil-tube holder; 3. Oil tube; 4. Tube limit part; 5. Elastic element; 6. Heating-wire cover; 7. Heating-wire holder; 8. Atomizing seat; 9. Atomizing casing; 10. Heating wire; 11. Indicating light; 12. Light-guiding plate; 13. PCBA board; 14. Board-fixing element; 15. Shell connector; 16. Supporting rod; 17. Power-supply shell; 23. First pipe cover; 24. Battery; 25. Pipe; 28. Pipe connector; 29. Second pipe cover; 32. Shell cover.

DETAILED DESCRIPTION OF THE EMBODIMENTS

For further illustrating the invention, experiments detailing an electronic cigarette of the invention are described below. It should be noted that the following examples are intended to describe and not to limit the invention.

As shown in FIGS. 1-5, an electronic cigarette comprising a power-supply assembly and an atomizing assembly is provided. The power-supply assembly comprises a power-supply shell 17, a shell connector 15, a first pipe cover 23, a pipe 25, a pipe connector 28 comprising threads, a battery 24, a second pipe cover 29 comprising threads, and a shell cover 32. The power-supply shell 17 comprises a cylindrical shell sidewall, a closing shell wall, and a shell cavity. The cylindrical shell sidewall comprises a first sidewall end and a second sidewall end having an opening, and the closing shell wall is disposed on the first sidewall end. The shell cavity is confined by the cylindrical shell sidewall and the closing shell wall. The pipe 25 comprises a first pipe end and a second pipe end. The atomizing assembly comprises an atomizing seat 8, a supporting rod 16, a heating-wire holder 7, a heating wire 10, a heating-wire cover 6, an atomizing casing 9, and an oil-tube assembly. The atomizing seat 8 comprises a flange plate, a seat boss, a cylindrical seat body, and a seat through hole. The flange plate comprises a first flange surface and a second flange surface; the seat boss extends from the first flange surface; and the cylindrical seat body extends from the second flange surface. The seat through hole extends through the cylindrical seat body, the flange plate, and the seat boss. The heating-wire cover 6 comprises a first heating-wire-cover end and a second heating-wire-cover end. The oil-tube assembly comprises an oil-tube holder 2, an elastic element 5, an oil tube 3, a tube limit part 4, and an oil-tube-assembly cover 1. The oil-tube holder 2 comprises an oil-tube-holder end, and the oil-tube-assembly cover 1 comprises an oil-tube through hole. In the electronic cigarette, the shell connector is fixed on the closing shell wall. In addition, the first pipe cover 23 is disposed within the shell cavity and fixed on the closing shell wall; the pipe 25 is disposed within the shell cavity; the first pipe end is fixed to the first pipe cover 23; the pipe connector 28 is fixed on the second pipe end; the battery 24 is inserted in the pipe 25; the second pipe cover 29 is screwed to the pipe connector 28; the battery 24 is enclosed by the pipe 25, the first pipe cover 23, and the second pipe cover 29; and the shell cover 32 is fixed to the second sidewall end. In addition, the cylindrical seat body is fixed to the shell connector 15; the supporting rod 16 is inserted in the seat through hole and is supported by the shell connector 15; the heating-wire holder 7 is inserted in the seat through hole and is supported by the supporting rod 16; the heating wire 10 is inserted in the heating-wire holder 7; the second heating-wire-cover end is inserted in the seat through hole and is fixed to the seat boss; and the heating-wire holder 7 is enclosed by the heating-wire cover 6. In addition, the atomizing casing 9 is disposed on the flange plate. In addition, the elastic element 5 is inserted in the oil-tube holder 2; the oil tube 3 is inserted in the oil-tube holder 2; the tube limit part 4 is inserted in and fixed to the oil-tube holder 2; the oil tube 3 is supported by the elastic element 5 and is abutted by the tube limit part 4; the oil-tube-assembly cover 1 is fixed to the oil-tube-holder 2; and the oil tube 3 extends through the oil-tube through hole. Furthermore, the oil-tube-holder end is fixed to the first heating-wire-cover end; and the atomizing casing 9 is abutted by the oil-tube-assembly cover 1. The electronic cigarette allows for replacing the battery 24 by unscrewing the second pipe cover 29 from the pipe connector 28.

Figure 4:
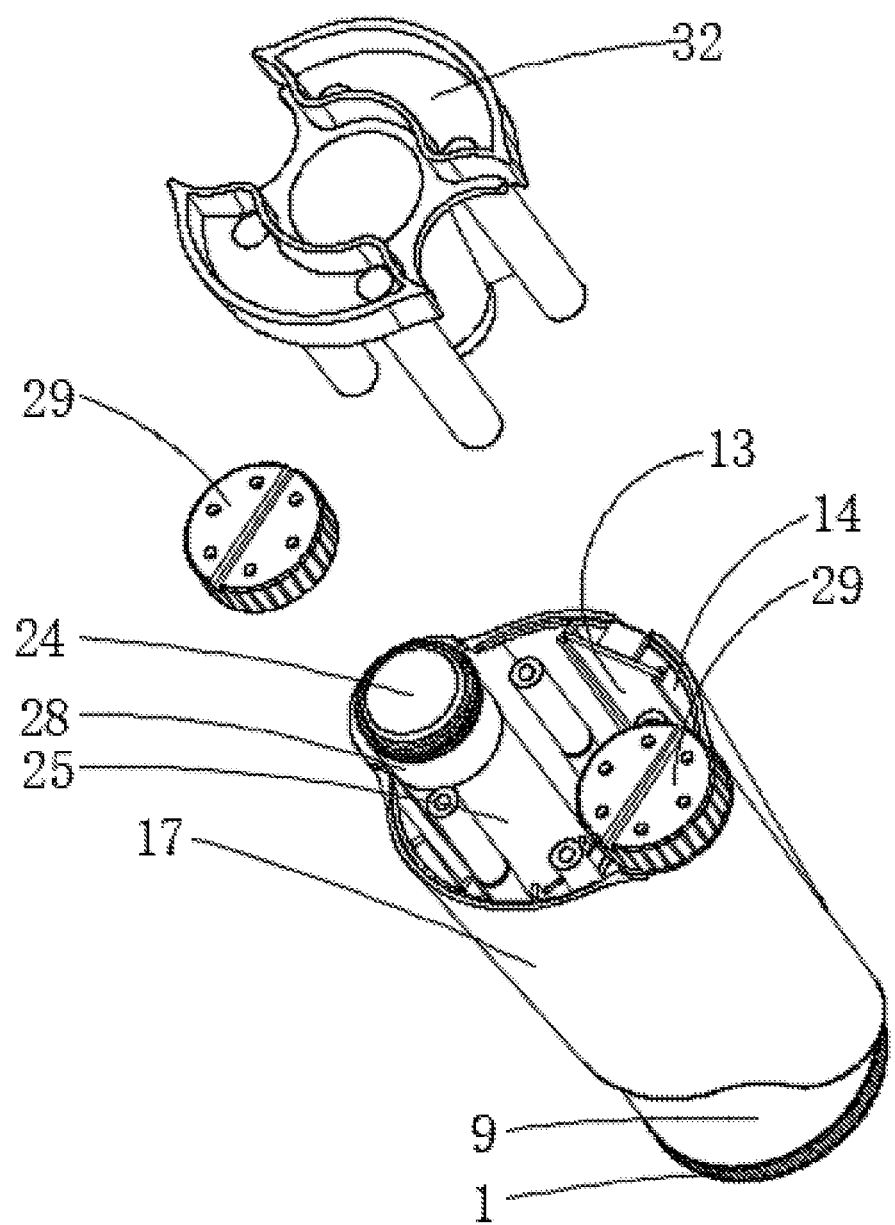
FIG. 4 is an exploded view of an electronic cigarette in accordance with one embodiment of the invention.
Figure 5:
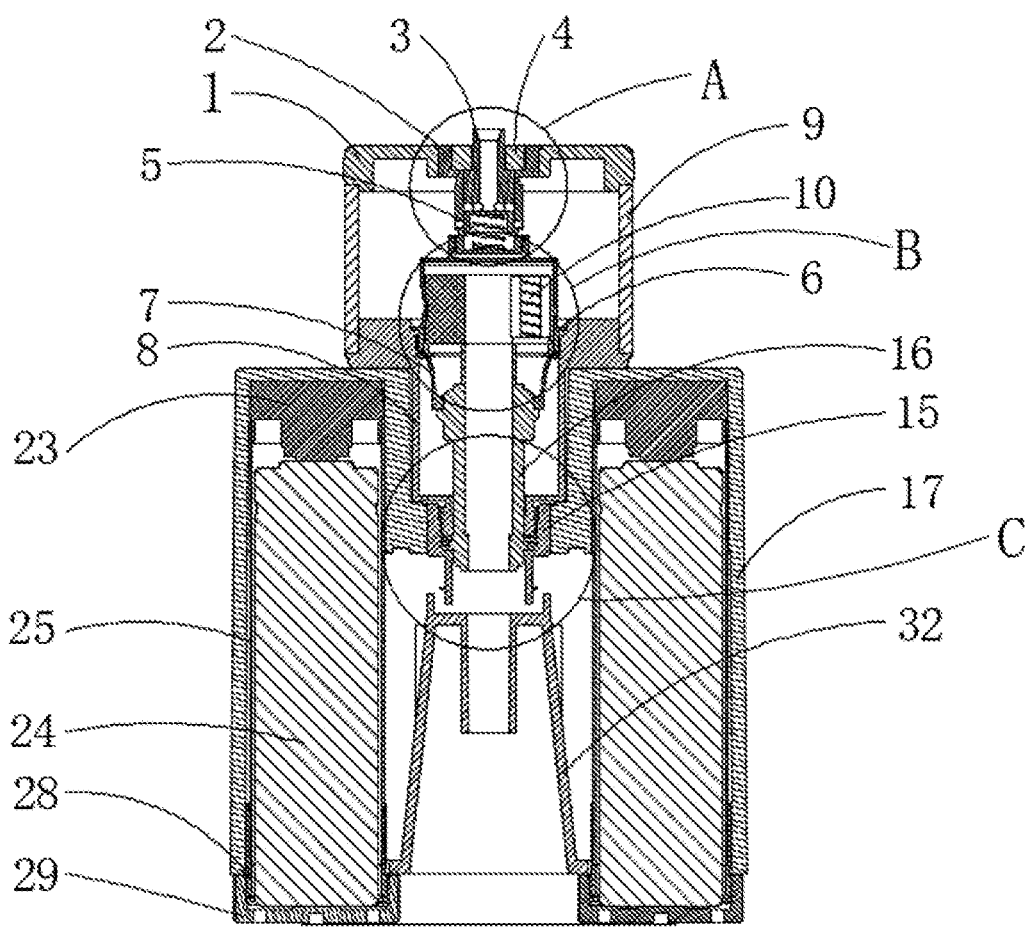
FIG. 5 is a sectional view of an electronic cigarette in accordance with one embodiment of the invention.
Figure 6:
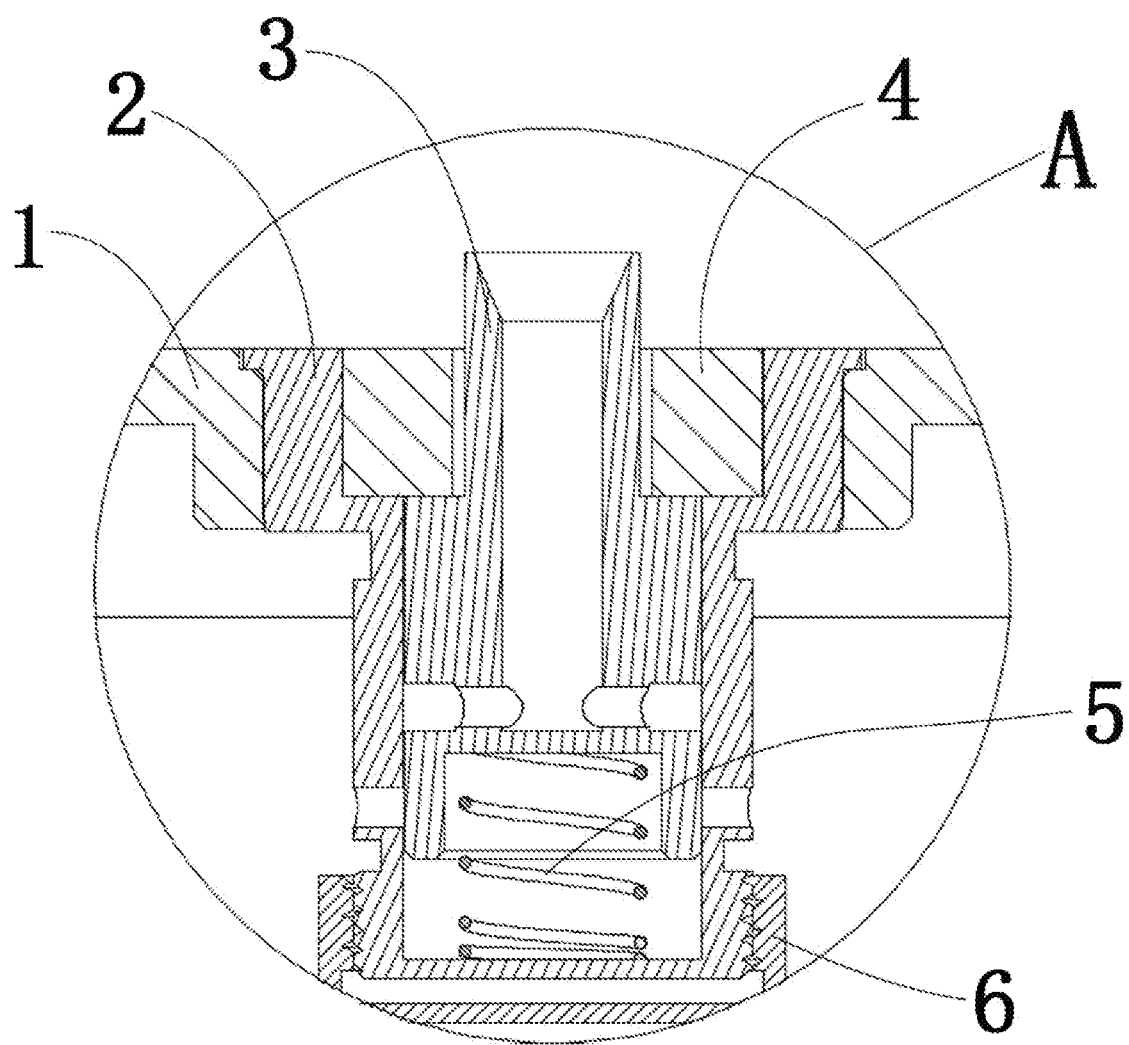
FIG. 6 is an enlarged view of the area A in FIG. 5.
Figure 7:
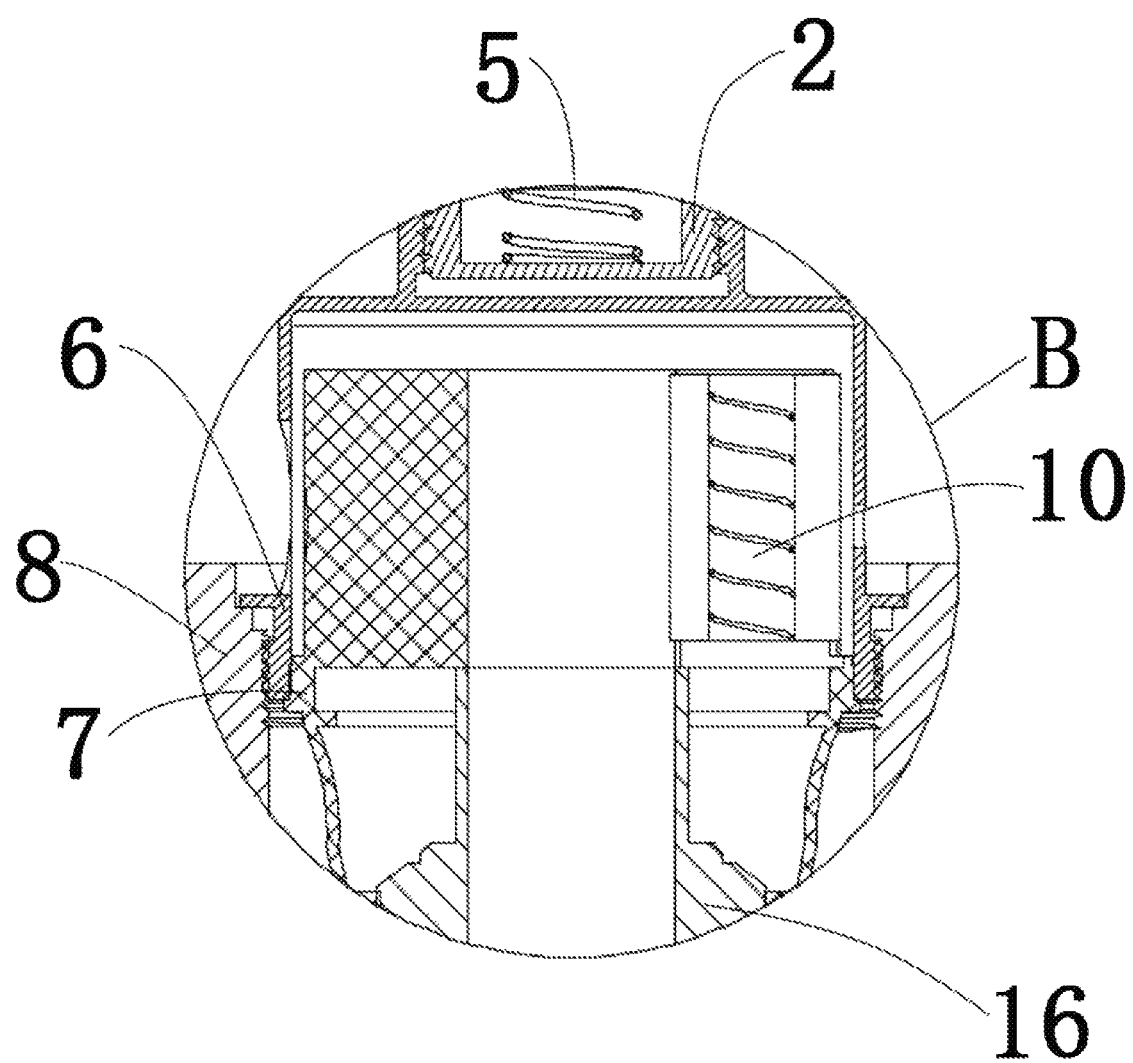
FIG. 7 is an enlarged view of the area B in FIG. 5.
Figure 8:
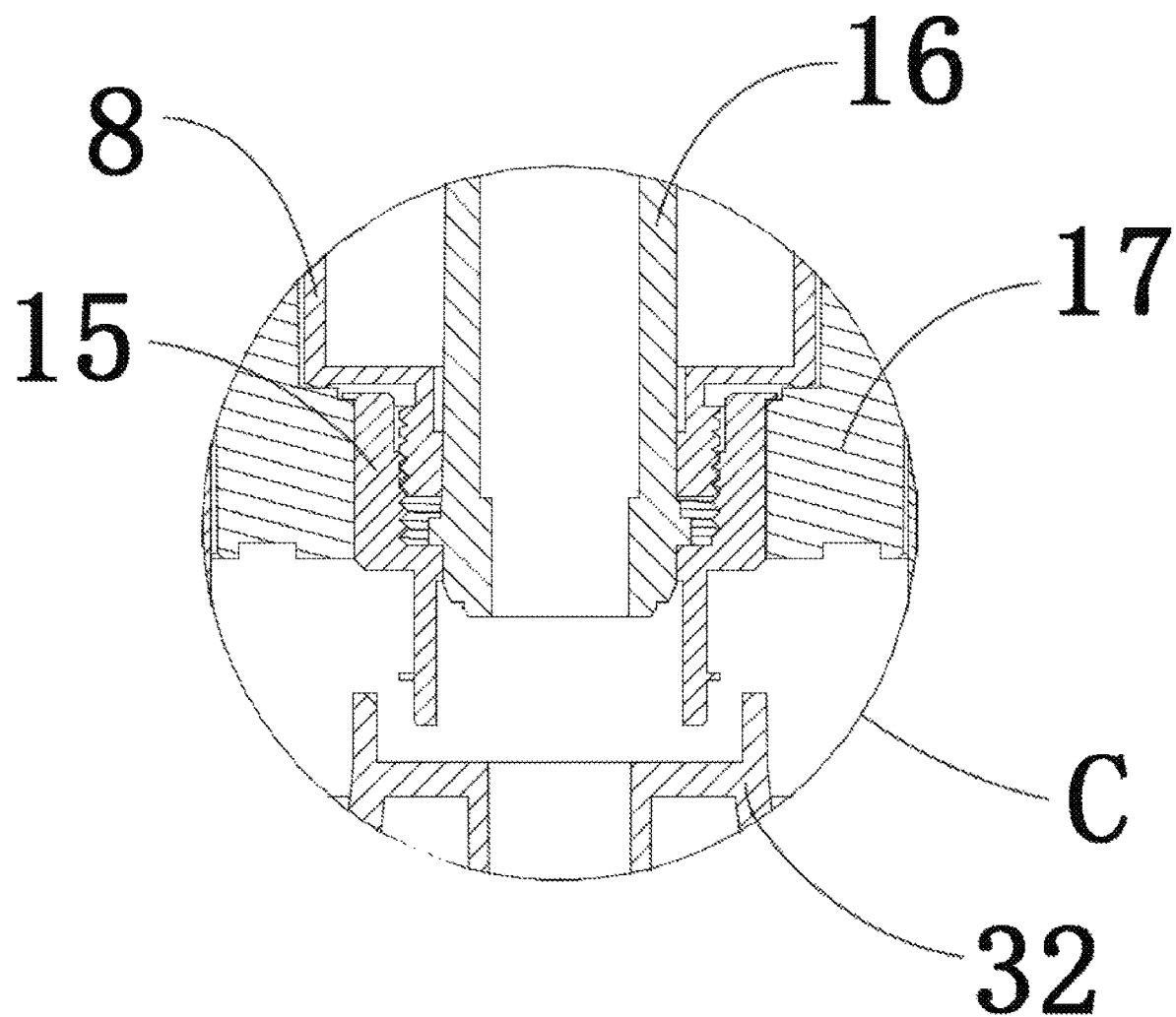
FIG. 8 is an enlarged view of the area C in FIG. 5.
Figure 9:
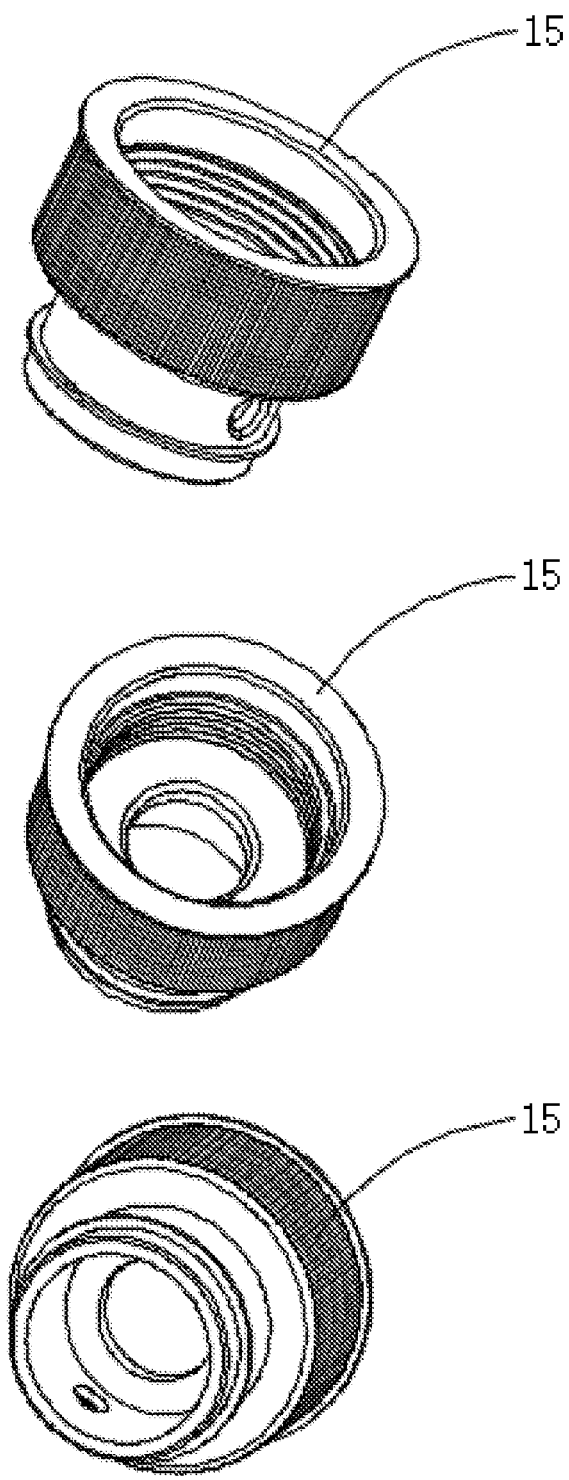
FIG. 9 shows perspective views of the shell connector in an electronic cigarette in accordance with one embodiment of the invention.

Preferably, as shown in FIGS. 1 and 4, the cigarette further comprises a light-guiding plate 12 and an indicating light 11, and the power-supply assembly further comprises a printed circuit board assembly (PCBA) board 13 disposed within said shell cavity. The light-guiding plate 12 is disposed on and covers the indicating light 11. In addition, the PCBA board 13 is connected to the battery 24 and to the indicating light 11. Furthermore, the indicating light 11 is adapted to reflect a state of said battery 24. By virtue of the indicating light 11, the user can judge what energy level the battery 24 has or whether the battery 24 fails. If the battery 24 is chargeable, the user can judge whether the battery 24 is in a charging state by virtue of the indicating light 11.

Preferably, as shown in FIGS. 5-6 and 11-12, the oil-tube-holder end and the first heating-wire-cover end comprise threads; and the oil-tube-holder end is screwed to the first heating-wire-cover end. This allows for detaching the oil-tube assembly for oil replenishment, maintenance, or replacement.

Preferably, as shown in FIGS. 5, 7, and 10-11, the second heating-wire-cover end and the seat boss comprises threads; and the second heating-wire-cover end is screwed to the seat boss. This allows for detaching the heating-wire cover 6 so to replace the heating wire 10.

Figure 2:
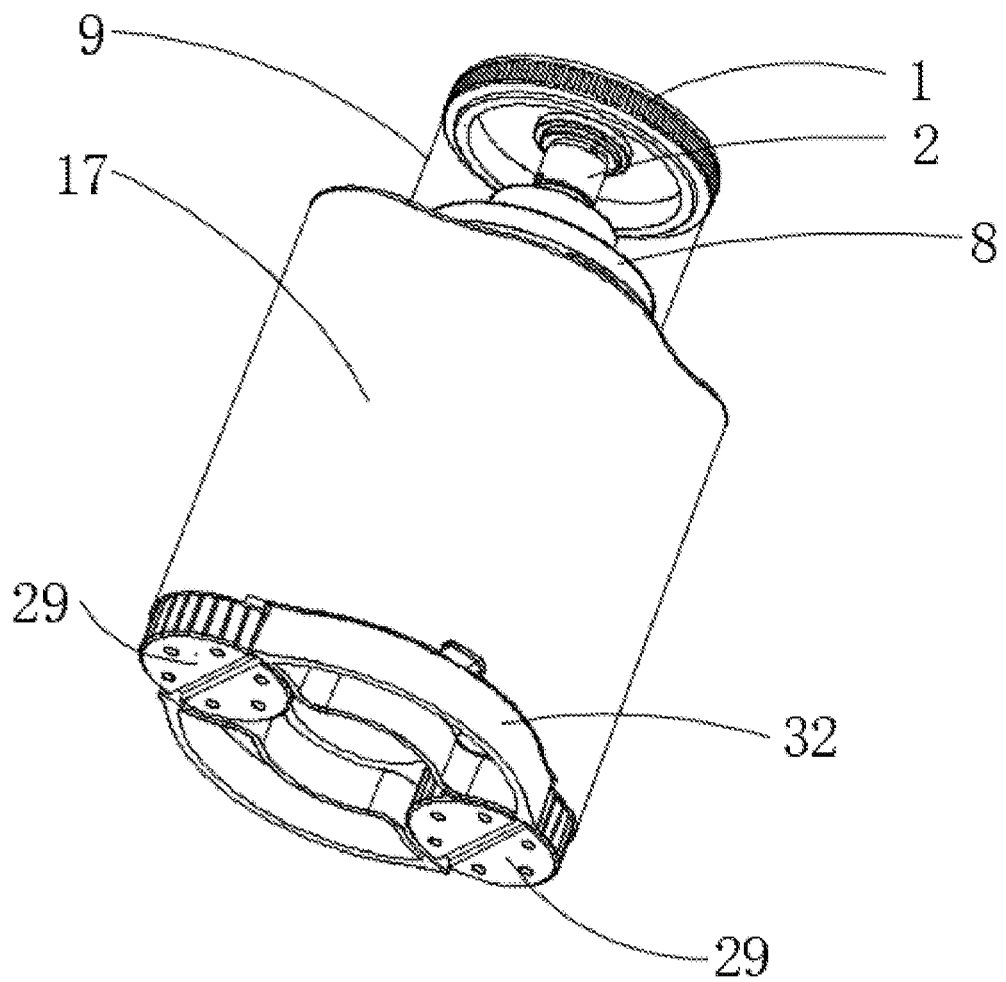
FIG. 2 is a second perspective view of an electronic cigarette in accordance with one embodiment of the invention.
Figure 3:
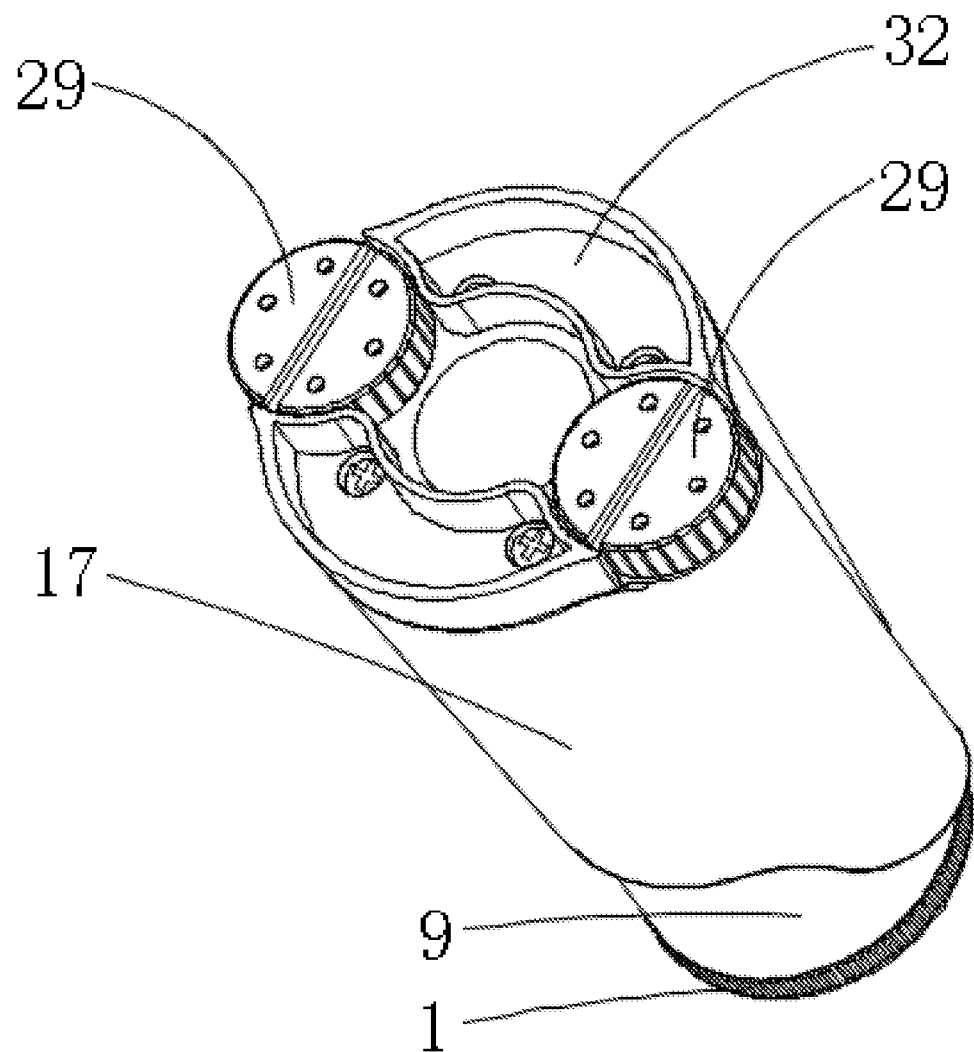
FIG. 3 is a third perspective view of an electronic cigarette in accordance with one embodiment of the invention.

Preferably, as shown in FIGS. 1-2, the atomizing casing 9 is transparent. Due to transparent atomizing casing 9, the user can observe the oil level in the oil tube 3 and the amount of smoke generated in the atomizing assembly.

Figure 10:
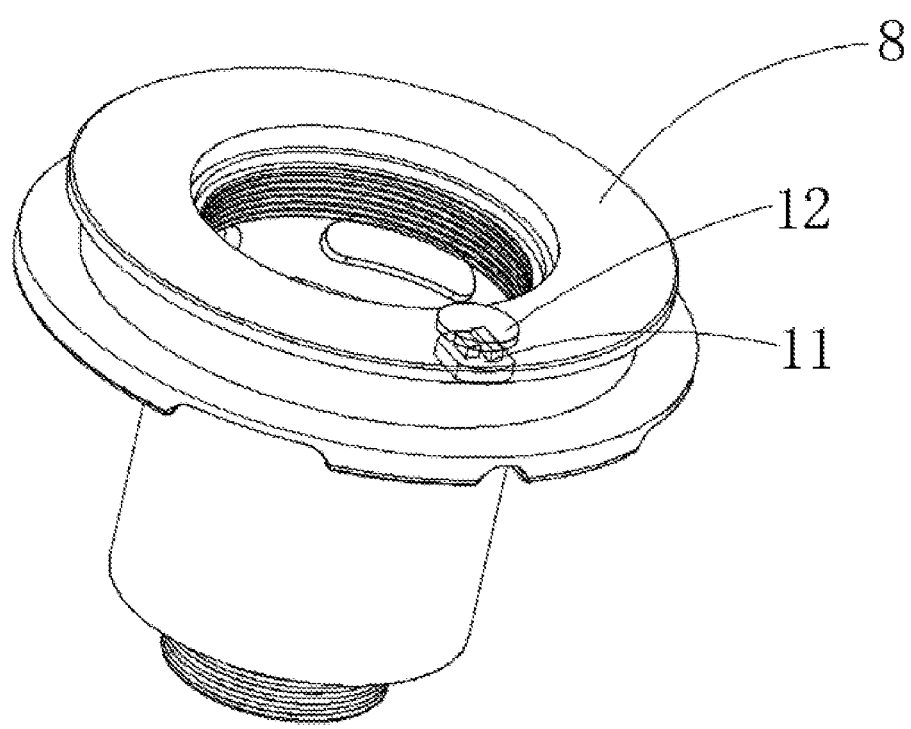
FIG. 10 is a perspective view of the atomizing seat in an electronic cigarette in accordance with one embodiment of the invention.
Figure 11:
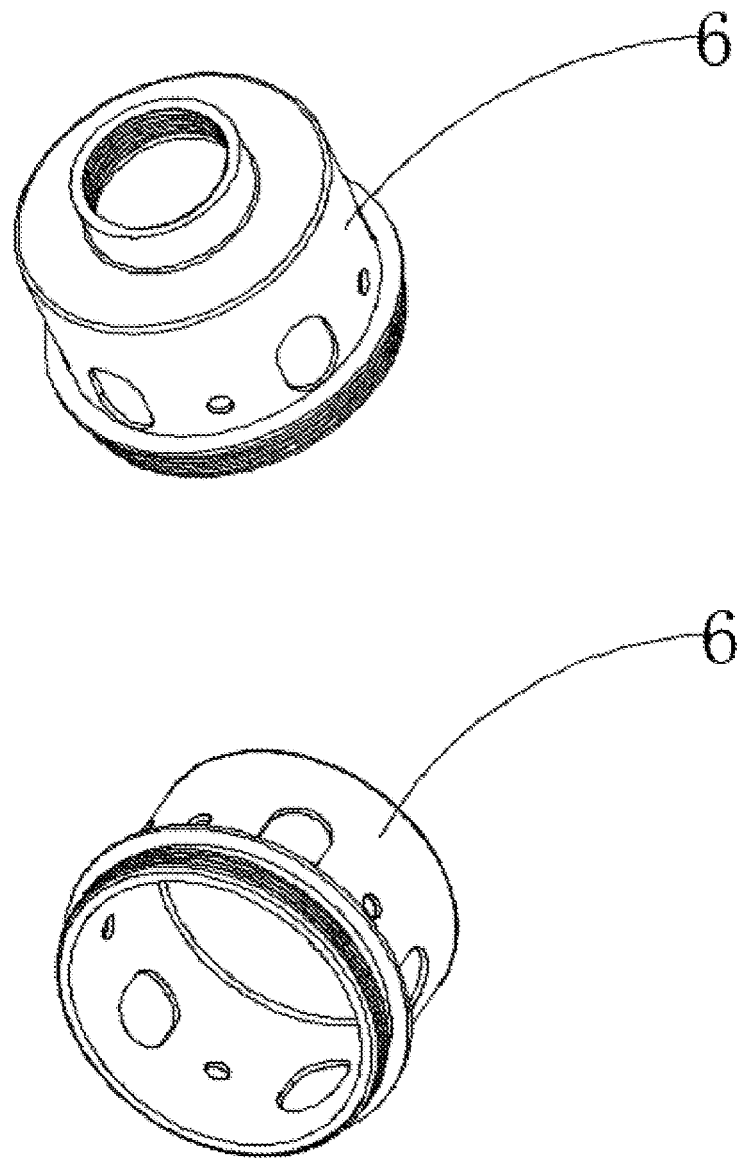
FIG. 11 shows perspective views of the heating-wire cover in an electronic cigarette in accordance with one embodiment of the invention.
Figure 12:
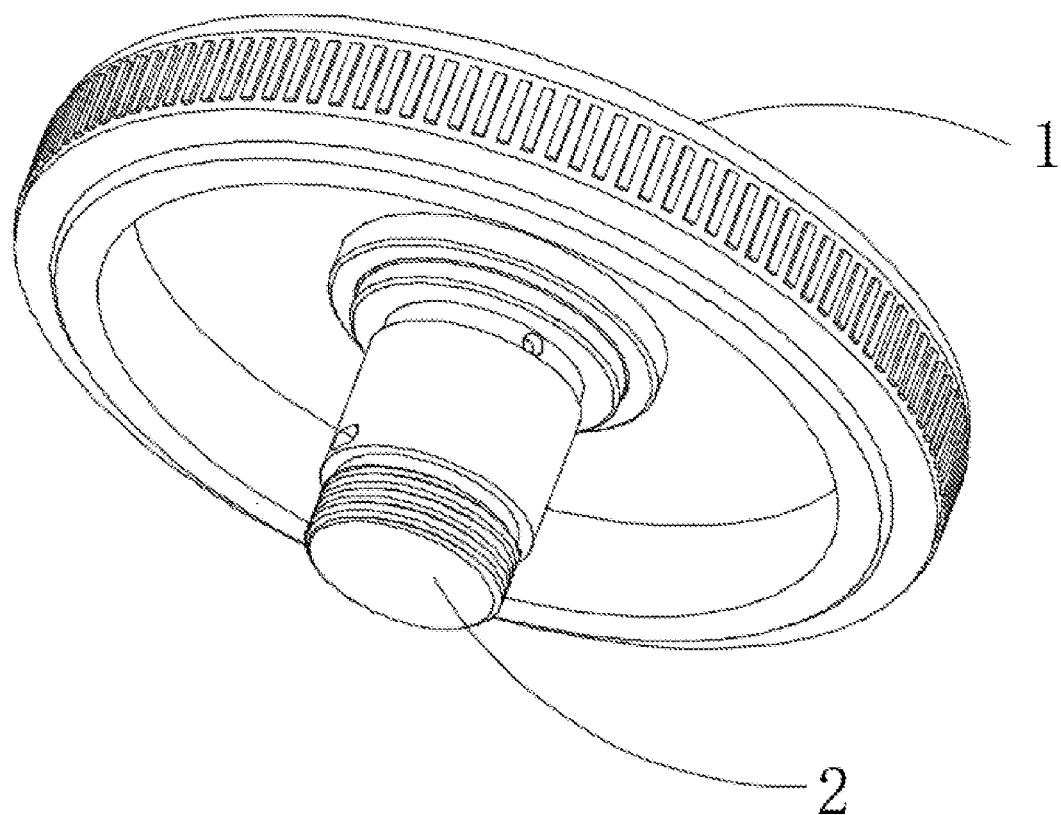
FIG. 12 is a perspective view of the oil-tube assembly in an electronic cigarette in accordance with one embodiment of the invention.

Preferably, as shown in FIGS. 1 and 10, the indicating light 11 is disposed on the seat boss, so that the indicating light 11 is observable through the transparent atomizing casing 9.

Preferably, as shown in FIGS. 5 and 8-10, the cylindrical seat body and the shell connector 15 comprise threads; and the cylindrical seat body is screwed to the shell connector 15. This allows for detaching the whole atomizing assembly for maintenance or replacement.

Preferably, as shown in FIG. 4, a board-fixing element 14 is disposed on the cylindrical shell sidewall and within the shell cavity. The board-fixing element 14 comprises slots for fixing the PCBA board 13.

Preferably, the tube limit part 4 is fixed to the oil-tube holder 2 via interference fit. In addition, the oil-tube-assembly cover 1 is fixed to the tube limit part 4 via interference fit. Furthermore, the shell cover 32 is fixed to the second sidewall end via screws.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electronic cigarette, comprising:
   1) a power-supply assembly comprising:
      1a) a power-supply shell; said power-supply shell comprising: a cylindrical shell sidewall comprising a first sidewall end and a second sidewall end having an opening; a closing shell wall disposed on said first sidewall end; and a shell cavity defined by said cylindrical shell sidewall and said closing shell wall;
      1b) a shell connector;
      1c) a first pipe cover;
      1d) a pipe; said pipe comprising a first pipe end and a second pipe end;
      1e) a pipe connector; said pipe connector comprising threads;
      1f) a battery;
      1g) a second pipe cover; said second pipe cover comprising threads; and
      1h) a shell cover; and
   2) an atomizing assembly comprising:
      2a) an atomizing seat; said atomizing seat comprising: a flange plate comprising a first flange surface and a second flange surface; a seat boss extending from said first flange surface; a cylindrical seat body extending from said second flange surface; and a seat through hole extending through said cylindrical seat body, said flange plate, and said seat boss;
      2b) a supporting rod;
      2c) a heating-wire holder;
      2d) a heating wire;
      2e) a heating-wire cover; said heating-wire cover comprising a first heating-wire-cover end and a second heating-wire-cover end;
      2f) an atomizing casing; and
      2g) an oil-tube assembly; said oil-tube assembly comprising: an oil-tube holder having an oil-tube-holder end; an elastic element; an oil tube; a tube limit part; and an oil-tube-assembly cover having an oil-tube through hole;

wherein:
   said shell connector is fixed on said closing shell wall;
   said first pipe cover is disposed within said shell cavity and fixed on said closing shell wall;
   said pipe is disposed within said shell cavity;
   said first pipe end is fixed to said first pipe cover;
   said pipe connector is fixed on said second pipe end;
   said battery is inserted in said pipe;
   said second pipe cover is screwed to said pipe connector;
   said battery is enclosed by said pipe, said first pipe cover, and said second pipe cover;
   said shell cover is fixed to said second sidewall end;
   said cylindrical seat body is fixed to said shell connector;
   said supporting rod is inserted in said seat through hole and is supported by said shell connector;
   said heating-wire holder is inserted in said seat through hole and is supported by said supporting rod;
   said heating wire is inserted in said heating-wire holder;
   said second heating-wire-cover end is inserted in said seat through hole and is fixed to said seat boss;
   said heating-wire holder is enclosed by said heating-wire cover;
   said atomizing casing is disposed on said flange plate;
   said elastic element is inserted in said oil-tube holder;
   said oil tube is inserted in said oil-tube holder;
   said tube limit part is inserted in and fixed to said oil-tube holder;
   said oil tube is supported by said elastic element and is abutted by said tube limit part;
   said oil-tube-assembly cover is fixed to said oil-tube-holder;
   said oil tube extends through said oil-tube through hole;
   said oil-tube-holder end is fixed to said first heating-wire-cover end; and
   said atomizing casing is abutted by said oil-tube-assembly cover.

2. The electronic cigarette of claim 1, further comprising a light-guiding plate and an indicating light; wherein:
   the power-supply assembly further comprises a printed circuit board assembly (PCBA) board disposed within said shell cavity;
   said light-guiding plate is disposed on said indicating light;
   said PCBA board is connected to said battery and to said indicating light; and
   said indicating light is adapted to reflect a state of said battery.

3. The electronic cigarette of claim 1, wherein:
said oil-tube-holder end comprises threads and said first heating-wire-cover end comprises threads; and
said oil-tube-holder end is screwed to said first heating-wire-cover end.

4. The electronic cigarette of claim 2, wherein:
said oil-tube-holder end comprises threads and said first heating-wire-cover end comprises threads; and
said oil-tube-holder end is screwed to said first heating-wire-cover end.

5. The electronic cigarette of claim 3, wherein:
said second heating-wire-cover end comprises threads and said seat boss comprises threads; and
said second heating-wire-cover end is screwed to said seat boss.

6. The electronic cigarette of claim 4, wherein:
said second heating-wire-cover end comprises threads and said seat boss comprises threads; and
said second heating-wire-cover end is screwed to said seat boss.

7. The electronic cigarette of claim 3, wherein said atomizing casing is transparent.

8. The electronic cigarette of claim 4, wherein said atomizing casing is transparent.

9. The electronic cigarette of claim 5, wherein said atomizing casing is transparent.

10. The electronic cigarette of claim 6, wherein said atomizing casing is transparent.

11. The electronic cigarette of claim 8, wherein said indicating light is disposed on said seat boss.

12. The electronic cigarette of claim 10, wherein said indicating light is disposed on said seat boss.

13. The electronic cigarette of claim 7, wherein:
said cylindrical seat body comprises threads and said shell connector comprises threads; and
said cylindrical seat body is screwed to said shell connector.

14. The electronic cigarette of claim 8, wherein:
said cylindrical seat body comprises threads and said shell connector comprises threads; and
said cylindrical seat body is screwed to said shell connector.

15. The electronic cigarette of claim 9, wherein:
said cylindrical seat body comprises threads and said shell connector comprises threads; and
said cylindrical seat body is screwed to said shell connector.

16. The electronic cigarette of claim 10, wherein:
said cylindrical seat body comprises threads and said shell connector comprises threads; and
said cylindrical seat body is screwed to said shell connector.

17. The electronic cigarette of claim 11, wherein:
said cylindrical seat body comprises threads and said shell connector comprises threads; and
said cylindrical seat body is screwed to said shell connector.

18. The electronic cigarette of claim 12, wherein:
said cylindrical seat body comprises threads and said shell connector comprises threads; and
said cylindrical seat body is screwed to said shell connector.

* * * * *